J. POHLE.
PRESERVING JAR BASKET.
APPLICATION FILED APR. 20, 1912.
1,064,248.
Patented June 10, 1913.
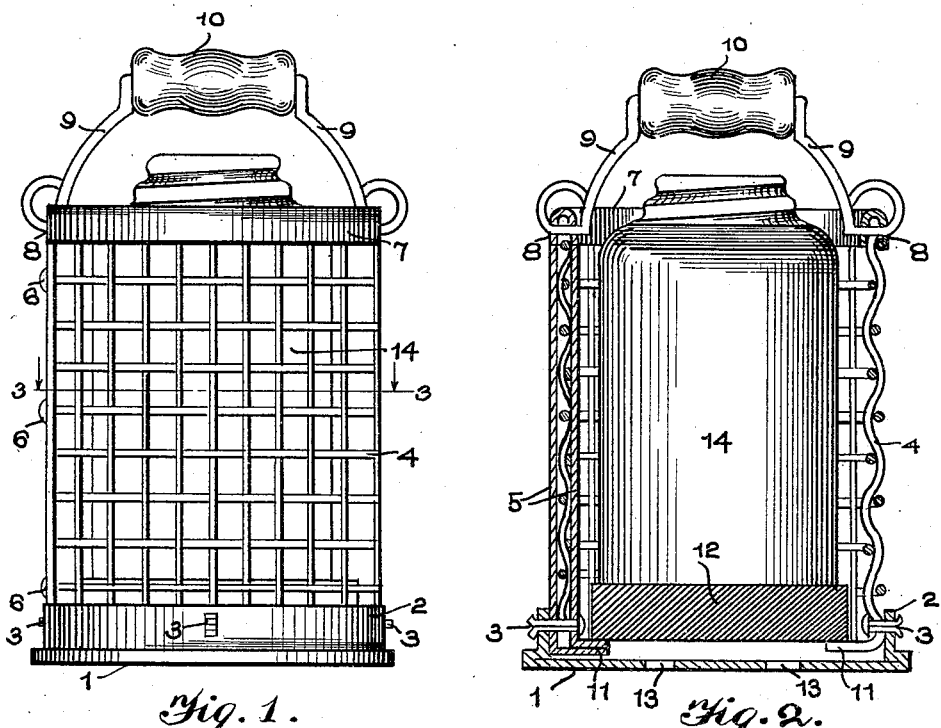
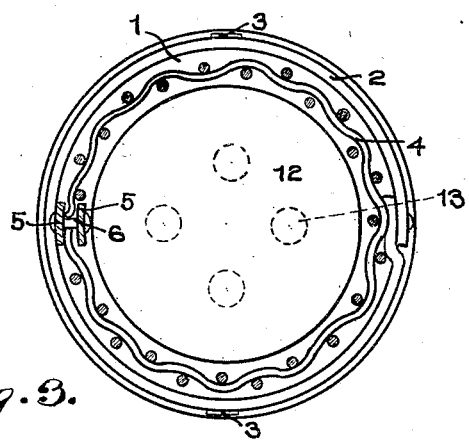
Inventor
Jennie Pohle.
Witnesses
By Joshua R. H. Potts
Attorney

UNITED STATES PATENT OFFICE.

JENNIE POHLE, OF LANSDALE, PENNSYLVANIA.

PRESERVING-JAR BASKET.

1,064,248.  Specification of Letters Patent.  Patented June 10, 1913.

Application filed April 20, 1912. Serial No. 692,187.

*To all whom it may concern:*

Be it known that I, JENNIE POHLE, a citizen of the United States, residing at Lansdale, in the county of Montgomery and State of Pennsylvania, have invented certain new and useful Improvements in Preserving-Jar Baskets, of which the following is a specification.

My invention relates to improvements in preserving jar baskets, the object of the invention being to provide an improved jar support which is adapted to hold the jar while preserving, which will prevent breaking of the jar, and which will permit the jar to be readily removed without burning the hands.

A further object is to provide an improved construction of jar holding basket having a removable jar supporting block normally in position to receive the jar and hold it out of contact with the metal of the basket.

With these and other objects in view, the invention consists in certain novel features of construction and combinations and arrangements of parts as will be more fully hereinafter described and pointed out in the claims.

In the accompanying drawings: Figure 1, is a view in side elevation illustrating my improvements. Fig. 2, is a view in vertical longitudinal section thereof, and Fig. 3, is a view in section on the line 3—3 of Fig. 1.

My improved jar holding basket which is designed primarily for holding glass jars while canning or preserving consists of a sheet metal bottom 1 which is provided with an upwardly projecting annular flange 2 secured by staples 3 or other suitable securing devices to an open work cylinder 4. This cylinder 4 is composed of relatively heavy wire netting, and its longitudinal edges are confined between metal strips 5 secured together by rivets 6. The upper edge of the wire mesh cylinder 4 is confined in an inverted U-shape sheet metal band 7, the latter having openings 8 to receive and pivotally support the ends of a bail 9, the latter having a handle 10 thereon. The lower ends of the strips 5 and the wire mesh cylinder 4 are bent inwardly forming supports 11 to receive a block 12 thereon and space the block from the bottom 1. This block 12 is preferably of wood or of some other non-metallic material, and is of such a diameter that it may be readily placed in the basket and removed therefrom.

The bottom 1 is provided with openings 13 through which the water may drain when the basket is lifted out of the boiling water. An ordinary Mason jar 14 is illustrated in position on the block 12, and this is the position it will assume while in the boiling water or steam during the preparation of the contents of the jar. Of course, the basket is limited to the particular cooking operation, but when used for canning purposes, the jar is placed in boiling water and contains the material to be canned. After it is left in the boiling water for the desired length of time, it is necessary to lift the jar out of boiling water and by providing my improved device, this can be done without scalding the hands as it is an easy matter to grasp the handle 10, which is preferably of wood, and lift the jar out of the water.

The block 12 which is preferably of wood, holds the glass jar out of contact with any metal of the basket, and this block prevents the jar from breaking when subjected to heat. The block will, of course, swell as it becomes saturated with the water, but it is sufficiently small in diameter to allow for this swelling without binding in the basket. As it is a non-conductor of heat, there is no transmission of heat from the metal to the glass jar, and the parts are free to expand and contract without danger of breaking the glass.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A preserving jar basket comprising a base, an upwardly projecting flange on the base, a wire mesh cylinder secured within the flange and having its lower end bent inwardly forming a support positioned above the bottom, a bail connected to the upper end of said cylinder, said bottom having openings therein, and a removable block of appreciably less diameter than the internal diameter of the cylinder, said block normally resting upon the inturned end of the cylinder and supported thereby above the bottom, substantially as described.

2. A preserving jar basket comprising a base, a wire mesh cylinder secured to the base and having an inwardly projecting lower end spaced from the base, a removable block of appreciably less diameter than the wire mesh cylinder, and supported on the inwardly bent end of the wire cylinder above the base, and said base having openings therein below the removable block, substantially as described.

In testimony whereof I have signed my name to this specification in the presence of two subscribing witnesses.

JENNIE POHLE.

Witnesses:
R. H. KRENKEL,
CHARLES E. POTTS.

Copies of this patent may be obtained for five cents each, by addressing the "Commissioner of Patents, Washington, D. C."